US006918669B1

(12) United States Patent
Tamborrino

(10) Patent No.: US 6,918,669 B1
(45) Date of Patent: Jul. 19, 2005

(54) EYEGLASS CORD WINDING DEVICE

(76) Inventor: Gary Tamborrino, 5080 Argus Dr., Los Angeles, CA (US) 90041

( * ) Notice: Subject to any disclaimer, the term of this patent is extended or adjusted under 35 U.S.C. 154(b) by 0 days.

(21) Appl. No.: 10/992,509

(22) Filed: Nov. 18, 2004

Related U.S. Application Data

(60) Provisional application No. 60/523,203, filed on Nov. 18, 2003.

(51) Int. Cl.[7] .............................................. G02C 1/00
(52) U.S. Cl. ...................................... 351/158; 242/380
(58) Field of Search .......................... 351/41, 158, 121; 242/380, 402

(56) References Cited

U.S. PATENT DOCUMENTS 5,898,472 A * 4/1999 Oshikawa ................... 351/156

5,954,288 A * 9/1999 Shih ........................... 242/380

\* cited by examiner

Primary Examiner—Hung Xuan Dang
(74) Attorney, Agent, or Firm—Goldstein Law Offices PC.

(57) ABSTRACT

An eyeglass cord winding device having a selectively extendable cord which is attachable to a frame of an existing pair of eyeglasses. The eyeglass cord winding device has a reel assembly housing which encloses a reel assembly having a reel and a coiled spring in mechanical contact with the reel. The cord is selectively extended from the reel assembly housing by a user pulling upon the leading end of the cord. The coiled spring biases the reel assembly to a retracted position wherein the cord is selectively wound around the reel. After attaching the leading end of the cord to the frame of the existing eyeglasses, a clip on the reel assembly housing is selectively attached to an item of clothing worn by the user, thereby preventing the accidental loss or misplacement of the eyeglasses after they have been removed from the head of the user.

5 Claims, 4 Drawing Sheets

EYEGLASS CORD WINDING DEVICE

CROSS REFERENCES AND RELATED SUBJECT MATTER

This application is a continuation of provisional patent application Ser. No. 60/523,203, filed in the United States Patent Office on Nov. 18, 2003.

BACKGROUND OF THE INVENTION

1. Field of the Invention

The invention generally relates to a winding device, and in particular relates to an eyeglass cord winding device having a selectively extendable cord which is attachable to a frame of an existing pair of eyeglasses.

2. Description of the Related Art

Eyeglasses are use by many millions of individuals. One major problem associated with the use of eyeglasses is the accidental loss or misplacement of the eyeglasses after they have been removed from the head of the user. Accordingly, there is a need for an eyeglass cord winding device having a cord which selectively extends from a housing, wherein the cord is attachable to a temple leg of a frame of an existing pair of eyeglasses, and wherein the housing is attachable to an item of clothing worn by the user, thereby preventing the accidental loss or misplacement of the eyeglasses after they have been removed from the head of the user.

A variety of eyeglass holders have been devised for use in conjunction with an existing pair of eyeglasses having a frame having a pair of temple legs extending therefrom. By way of example, U.S. Pat. No. 6,182,334 to Davancens appears to show an end fastener for attaching an end of an eyeglass cord to a temple leg of a pair of eyeglasses.

Moreover, a variety of winding devices having a selectively extendable cord have been devised, some intended for use in conjunction with an existing pair of eyeglasses. For example, U.S. Pat. No. 5,954,288 to Shih appears to show a winding device for use in conjunction with various personal articles, having a retractable winding mechanism and a support clip. Additionally, U.S. Pat. No. 5,898,472 to Oshikawa appears to show a winding device which is selectively attachable to an item of clothing worn by the user and which has a retractable cord for holding a pair of eyeglasses.

While these devices may be suitable for the particular purpose employed, or for general use, they would not be as suitable for the purposes of the present invention as disclosed hereafter.

SUMMARY OF THE INVENTION

It is an object of the invention to provide an eyeglass cord winding device which prevents the accidental loss or misplacement of a pair of eyeglasses after they have been removed from a head of a user. Accordingly, the eyeglass cord winding device has a reel assembly housing having a cord selectively extending therefrom. The cord is attachable to a frame of the existing pair of eyeglasses, and the housing is attachable to an item of clothing worn by the user, thereby preventing the accidental loss or misplacement of the eyeglasses after they have been removed from the head of the user.

It is another object of the invention to provide an eyeglass cord winding device having a cord which may be selectively retracted into the reel assembly housing as desired. Accordingly, the reel assembly housing has a reel and a coiled spring. The coiled spring biases the reel assembly to the retracted position wherein the cord is selectively retracted within the reel assembly housing and wound around the reel.

It is an object of the invention to provide an eyeglass cord winding device wherein the cord may be immobilized at an extended position. Accordingly, the eyeglass cord winding device has a cord locking mechanism capable of selectively engaging a portion of the cord, in order to immobilize the cord at an extended position.

Further objects of the invention will become apparent in the detailed description of the invention which follows.

The invention is an eyeglass cord winding device having a selectively extendable cord which is attachable to a frame of an existing pair of eyeglasses. The eyeglass cord winding device has a reel assembly housing which encloses a reel assembly having a reel and a coiled spring in mechanical contact with the reel. The cord is selectively extended from the reel assembly housing by a user pulling upon the leading end of the cord. The coiled spring biases the reel assembly to a retracted position wherein the cord is selectively wound around the reel. After attaching the leading end of the cord to the frame of the existing eyeglasses, a clip on the reel assembly housing is selectively attached to an item of clothing worn by the user, thereby preventing the accidental loss or misplacement of the eyeglasses after they have been removed from the head of the user.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 4:
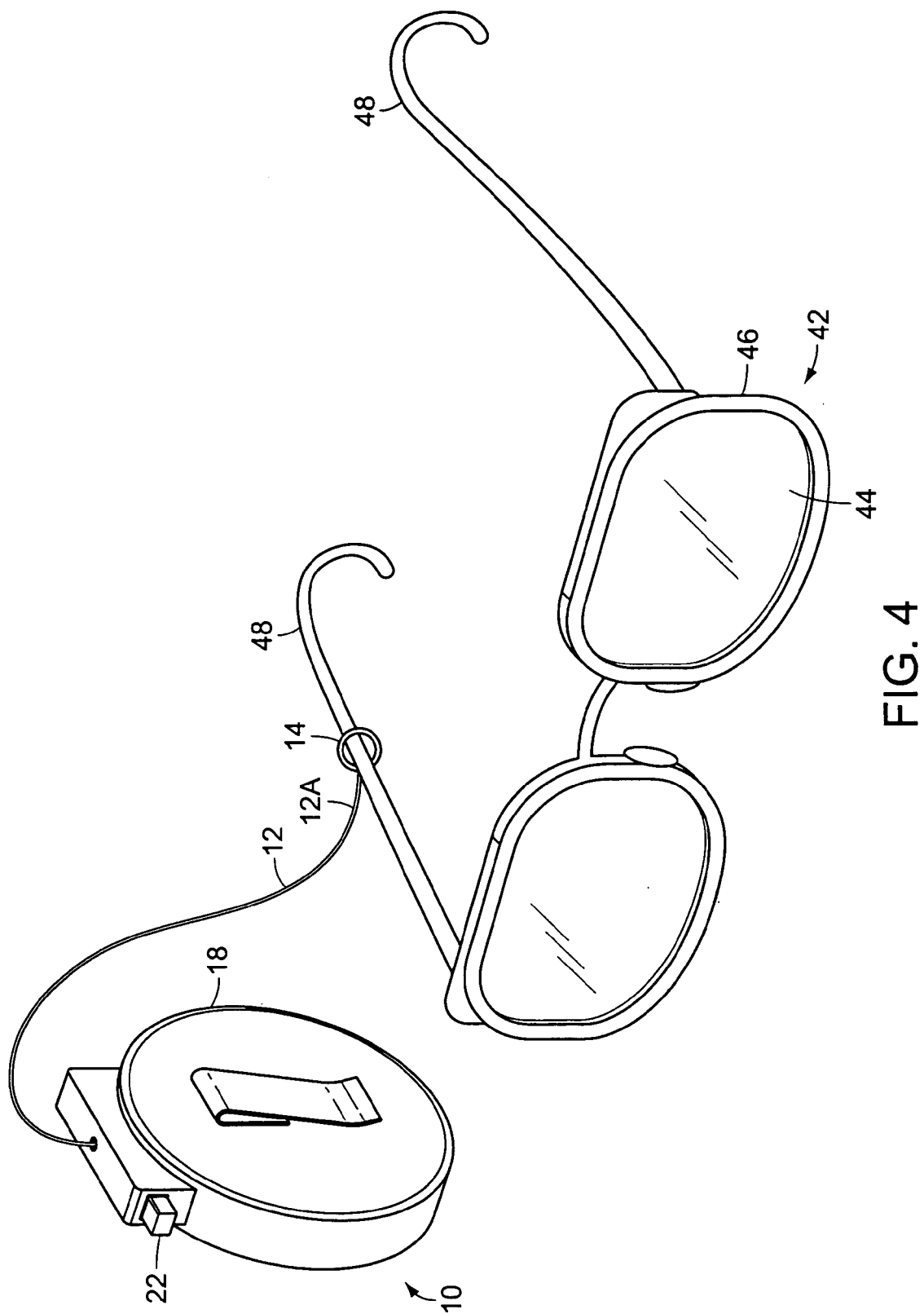
FIG. 4 a perspective view of the eyeglass cord winding device as in FIG. 1, except wherein a frame of an existing pair of eyeglasses has been selectively attached to a leading end of the cord.

FIG. 4 illustrates an eyeglass cord winding device 10 being used in conjunction with an existing pair of eyeglasses 42 having two lenses 44 and an eyeglass frame 46 for supporting the lenses 44, said eyeglass frame 46 having two temple legs 48 for selective attachment to the head of the user. The eyeglass cord winding device 10 has a selectively extendable cord 12. In FIG. 4, the cord 12 has been partially extended, as will be described, and has been selectively attached to one of the temple legs 48 of the eyeglass frame 46, as will also be described.

Figure 1:
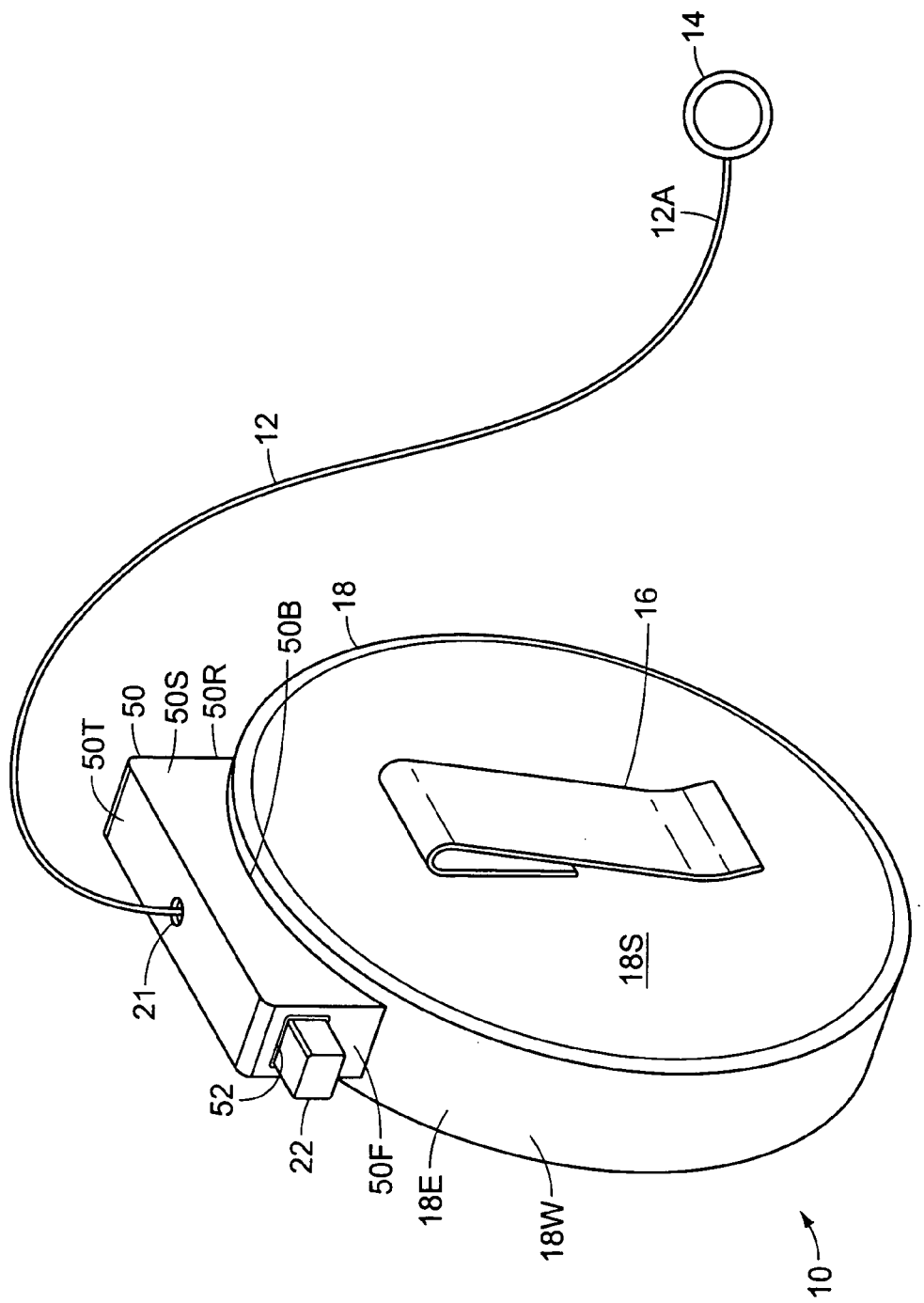
FIG. 1 is a perspective view of an eyeglass cord winding device, wherein a length of cord extends therefrom.
Figure 2:
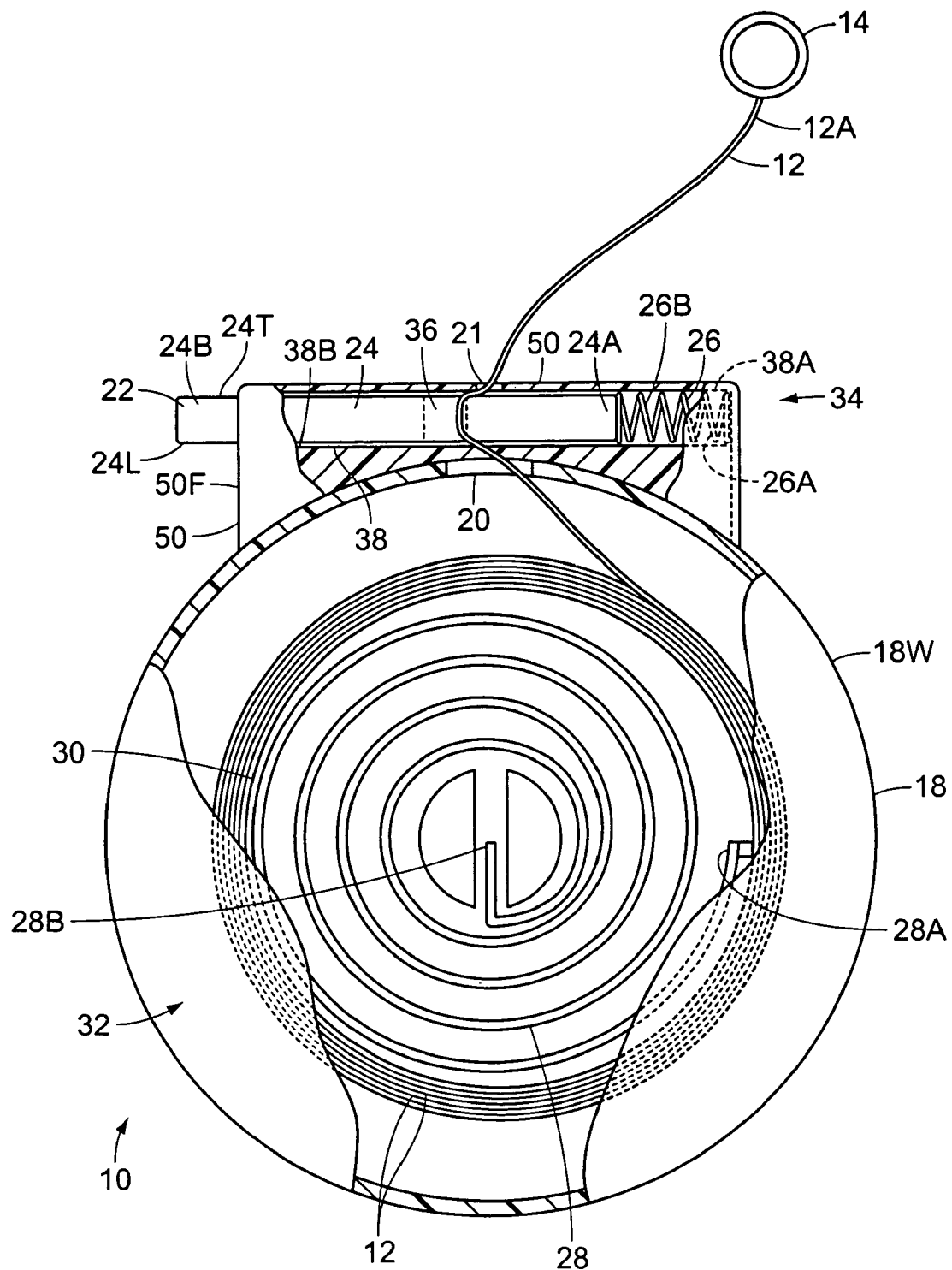
FIG. 2 is a side view of the eyeglass cord winding device, wherein a cord locking mechanism is in a locked position, and wherein portions of a reel assembly housing and a cord lock housing have been broken away to illustrate internal details thereof.

Turning to FIG. 1, the eyeglass cord winding device 10 has a substantially hollow, cylindrical reel assembly housing 18, having two opposing sides 18S, and a curved wall 18W extending therebetween. Turning to FIG. 2, the reel assembly housing 18 contains a reel assembly 32 therein. The reel assembly 32 has a reel 30 and a coiled spring 28 associated with the reel 30. The coiled spring 28 biases the reel assembly 32 to the retracted position.

The cord 12 has an attached end which is anchored to the reel 30 and a leading end 12A having an attached O-ring 14 through which one of the temple legs 48 of the eyeglass frame 46 is selectively extended in order to attach the eyeglass frame 46 to the cord 12. The cord 12 is preferably made from a flexible material such as plastic, elastic, or fabric material.

The eyeglass cord winding device 10 has a storage position and a deployed position. The cord 12 is selectively wound around the reel 30 when the eyeglass cord winding device 10 is in the storage position. Alternately, the cord 12 is partially or fully extended from the associated reel 30 when the eyeglass cord winding device 10 is in the deployed position, as will be described.

Returning to FIG. 1, the wall 18W of the reel assembly housing 18 has an externally oriented surface 18E having a substantially rectangular cord lock housing 50 mounted thereunto. The cord lock housing 50 has a top 50T, two opposing sides 50S, a rear 50R, a bottom 50B, and a front 50F having a rectangular opening 52 extending fully therethrough. The arcuate bottom 50B of the cord lock housing 50 is rigidly attached to the arcuate externally oriented surface 18E of the curved wall 18. Returning to FIG. 2, the cord lock housing 50 encloses a substantially rectangular and hollow chamber 38 having a sealed first end 38A closer to the rear 50R of the cord lock housing 50, and having a second end 38B which is closer to the front 50F of the cord lock housing 50. The cord lock housing 50 substantially encloses a cord locking mechanism 34.

The cord locking mechanism 34 comprises a tension spring 26 having a first end 26A and a second end 26B. The tension spring 26 is positioned within the chamber 38. In particular, the first end 26A of the tension spring 26 is attached in proximity to the first end 38A of the chamber 38. The cord locking mechanism 34 further has a substantially rectangular shaft 24 having a top 24T, a bottom 24L, and a slot 36 extending from the top 24T fully to the bottom 24L. The shaft 24 has a first end 24A which abuts the second end 26B of the tension spring 26, and a second end 24B which comprises a release button 22 which selectively extends from the rectangular opening 52 within the front 50F of the cord lock housing 50.

The curved wall 18W of the reel assembly housing 18 has an opening 20 extending fully therethrough. The top 50T of the cord lock housing 50 has an opening 21 extending fully therethrough. The leading end 12A of the cord 12 extends from the opening 20 in the reel assembly housing 18, through the slot 36 of the shaft 24, and then through the opening 21 within the top 50T of the cord lock housing 50.

The cord locking mechanism 34 has a locked and an unlocked position. FIG. 2 illustrates the cord locking mechanism 34 in the locked position, wherein the cord 12 which extends through the slot 36 of the shaft 24 is crimped between the shaft 24 and the cord lock housing 50, and is unable to be extended by the user pulling upon the leading end 12A, or to be retracted into the reel assembly housing 18 by the bias of the coiled spring 28 contained therein.

The tension spring 26 has an equilibrium expanded position and a compressed position. FIG. 2 illustrates the tension spring 26 in the expanded position. The tension spring 26 biases the cord locking mechanism 34 to the locked position, wherein the release button 22 is extended from the rectangular opening 52 in the front 50F of the cord lock housing 50.

Figure 3:
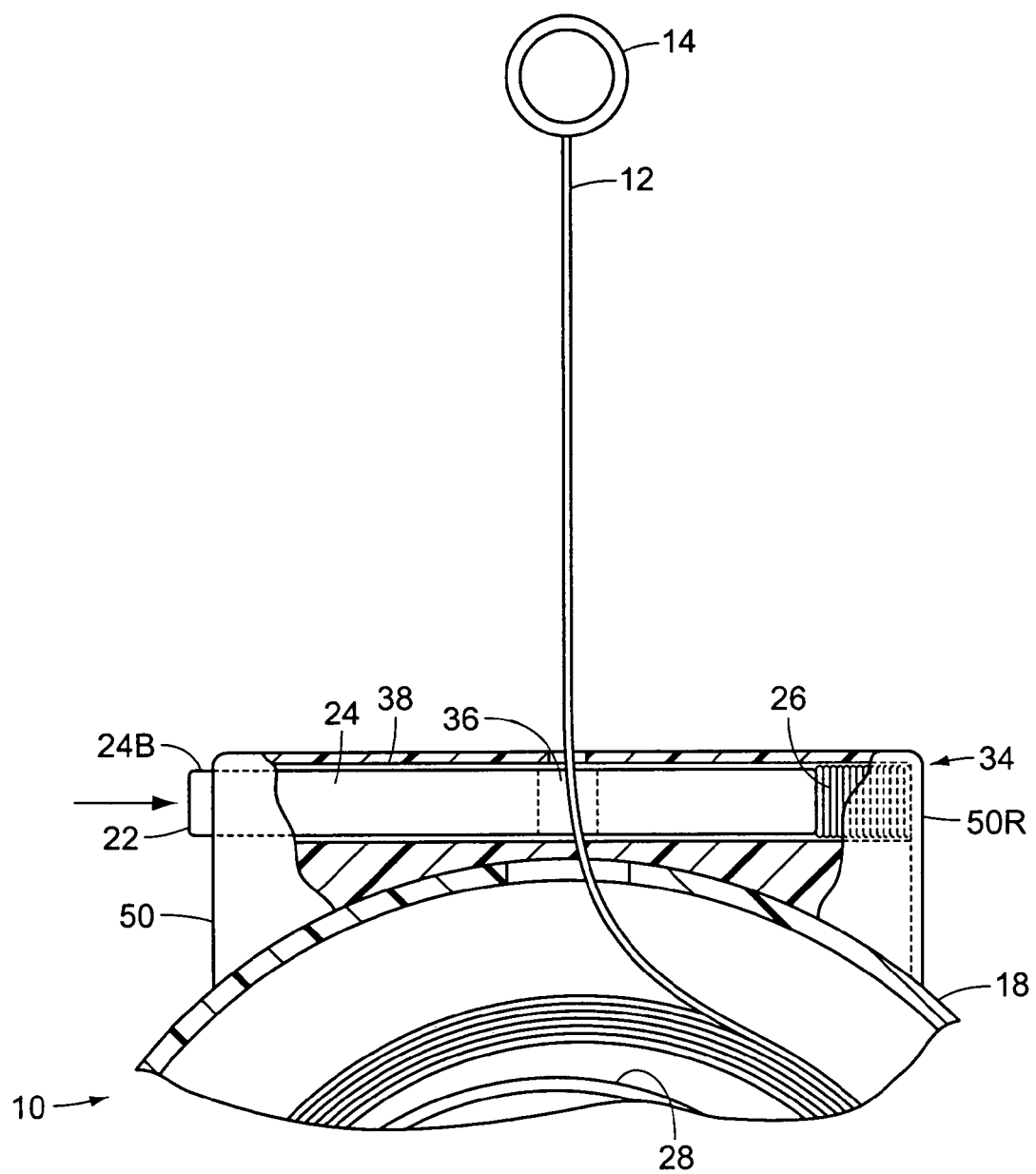
FIG. 3 is a side view of the eyeglass cord winding device, wherein the cord locking mechanism is in the unlocked position, wherein portions of the reel assembly housing and the cord lock housing have been broken away to illustrate internal details thereof, and wherein a release button has been pressed in the direction of the arrow in order to unlock the cord locking mechanism.

FIG. 3 illustrates the eyeglass cord winding device 10 after the button 22 has been depressed by the user. Depressing the release button 22 causes the shaft 24 to slide within the chamber 38 toward the rear 50R of the cord lock housing 50, to a position wherein the cord 12 which extends through the slot 36 of the shaft 24 is no longer crimped between the shaft 24 and the cord lock housing 50, and is free to be extended by the user pulling upon the leading end 12A, or to be retracted into the reel assembly housing 18 by the bias of the coiled spring 28 contained therein. Depression of the release button 22, concurrent with causing the shaft 24 to slide within the chamber 38 toward the rear 50R of the cord lock housing 50, additionally causes the tension spring 26 to compress. Upon release of the button 22, the tension spring 26 returns to the equilibrium expanded position illustrated in FIG. 2, wherein the cord locking mechanism 34 is in the locked position, wherein the cord 12 is once again immobilized between the shaft 24 and the cord lock housing 50.

Returning to FIG. 1, one of the sides 18S of the reel assembly housing 18 has a substantially U-shaped clip 16 attached thereunto. The U-shaped clip 16 is used for selectively attaching the eyeglass cord winding device 10 to an item of clothing worn by the user by extending an edge of said item of clothing between the U-shaped clip 16 and the side 18S of the reel assembly housing 18. In addition, other attaching devices, such as an alligator-type clip, or even a double-sided adhesive might be used in place of the U-shaped clip.

In FIG. 4, the eyeglass frame 46 has been attached to the leading end 12A of the cord 12 by extending one of the temple legs 48 of the frame 46 through the O-ring 14 positioned at the leading end 12A of the cord 12. The cord 12 has been partially unwound from its associated reel 30 and selectively partially extended from the reel assembly housing 18 and from the cord lock housing 50, in order to allow the user to selectively attach the eyeglasses 42 to the head of the user, or alternately, to suspend the eyeglasses 42 from a length of the cord 12, within easy reach of the user. The cord 12 is "locked" in the extended position by the cord locking mechanism 34 enclosed within the cord lock housing 50.

In use, the user attaches the eyeglass frame 46 to the leading end 12A of the cord 12 by extending one of the temple legs 48 of the frame 46 through the O-ring 14 attached at the leading end 12A of the cord 12. The user clips the eyeglass cord winding device 10 onto an item of clothing worn by the user with the U-shaped clip 16. The user extends the cord 12 from the reel assembly housing 18 by pulling upon the leading end 12A of the cord 12. The cord 12 remains at the extended position because the tension spring 26 biases the cord locking mechanism 34 to the locked position, wherein the cord 12 is immobilized by the cord locking mechanism 34. When the user no longer desires to extend the eyeglasses 42 upon the cord 12, the cord 12 is retracted into the reel assembly housing 18 by the user depressing the button 22. The eyeglass frame 46 may be detached from the cord 12, and the eyeglass cord winding device 10 may be stored until once again needed.

In conclusion, herein is an eyeglass cord winding device for selectively extending an eyeglass frame upon a cord, in order to allow a user to either wear the eyeglasses on the head of the user, or alternately, to suspend the eyeglasses upon the cord until the eyeglasses are to be worn by the user. The invention is illustrated by example in the drawing figures, and throughout the written description. It should be understood that numerous variations are possible, while adhering to the inventive concept. Such variations are contemplated as being a part of the present invention.

What is claimed is:

1. An eyeglass cord winding device, for attaching to a pair of eyeglasses having a frame, comprising:
    a cord, having a leading end having and o-ring on said leading end for attaching to the eyeglass frame;
    a reel assembly housing having a curved wall;
    a reel assembly having a reel and a coiled spring, the cord is wound upon the reel from an end of the cord opposite from the o-ring, the coiled spring biases the reel assembly toward a storage position wherein the cord is fully wound around the reel; and
    a cord lock housing attached to the reel assembly housing having a shaft extending tangentially to the curved wall and a release button, the cord extending through the cord lock housing, the cord lock housing selectively pinching the cord with the shaft to prevent the cord from winding on the reel into the storage position and selectively allowing the cord to retract onto the reel by pressing the release button.

2. The eyeglass cord winding device as recited in claim 1, wherein the curved wall of the reel assembly housing has an opening through which the cord exits the reel housing;
    wherein the cord lock housing has a top having an opening, and an arcuate bottom that is rigidly attached to the curved wall of the reel assembly; wherein the shaft has a slot;
    wherein the cord extends into the cord lock housing through the slot of the shaft and out through the opening in the top of the cord lock housing; and wherein the lock housing has a tension spring that biases the shaft into a locked position wherein the cord is pinched between the slot in the shaft and the opening in the top of the cord lock housing.

3. The eyeglass cord winding device as recited in claim 2, wherein the cord lock housing has a front and rear, a rectangular opening is located at the front; wherein the release button protrudes from the front of the cord lock housing and is attached to the shaft; and wherein pressing the release button causes the shaft to slide within the chamber toward the rear of the cord lock housing.

4. The eyeglass cord winding device as recited in claim 3, wherein the reel assembly housing has a pair of sides, and has a clip attached on one of the sides for selectively attaching the eyeglass cord winding device to an item of clothing worn by a user of the eyeglasses by extending an edge of said item of clothing between the clip and the side of the reel assembly housing.

5. The eyeglass cord winding device as recited in claim 4, wherein the tension spring is located between the shaft and the rear of the cord lock housing.

* * * * *